United States Patent
Mann et al.

(10) Patent No.: US 9,403,326 B2
(45) Date of Patent: Aug. 2, 2016

(54) PRESSURE RELEASE DEVICE FOR A HOUSING WITH FLAMEPROOF ENCAPSULATION AND METHOD FOR THE PRODUCTION THEREOF

(71) Applicant: R. Stahl Schaltgerate GmbH, Waldenburg (DE)

(72) Inventors: Ulrich Mann, Schwabisch Hall (DE); Bernd Limbacher, Schwabisch Hall (DE)

(73) Assignee: R. Stahl Schaltgeräte GmbH, Waldenburg (DE)

( * ) Notice: Subject to any disclaimer, the term of this patent is extended or adjusted under 35 U.S.C. 154(b) by 0 days.

(21) Appl. No.: 14/469,179

(22) Filed: Aug. 26, 2014

(65) Prior Publication Data
US 2015/0060464 A1   Mar. 5, 2015

(30) Foreign Application Priority Data
Aug. 27, 2013 (DE) .......................... 10 2013 109 259

(51) Int. Cl.

| | |
|---|---|
| B22D 19/00 | (2006.01) |
| B22D 19/02 | (2006.01) |
| B22D 19/04 | (2006.01) |
| B29C 70/76 | (2006.01) |
| B29C 39/10 | (2006.01) |
| B29C 39/38 | (2006.01) |
| B65D 85/00 | (2006.01) |
| A62C 4/00 | (2006.01) |
| B29K 705/12 | (2006.01) |
| A62C 3/16 | (2006.01) |

(52) U.S. Cl.
CPC ................. *B29C 70/763* (2013.01); *A62C 4/00* (2013.01); *B22D 19/02* (2013.01); *B29C 39/10* (2013.01); *B29C 39/38* (2013.01); *B65D 85/00* (2013.01); *A62C 3/16* (2013.01); *B29K 2705/12* (2013.01); *B29K 2995/0016* (2013.01); *B29K 2995/0065* (2013.01)

(58) Field of Classification Search
CPC ......... B22D 19/00; B22D 19/02; B22D 19/04
USPC ............................................... 164/91, 98, 112
See application file for complete search history.

(56) References Cited

U.S. PATENT DOCUMENTS

| | | | | |
|---|---|---|---|---|
| 3,173,451 | A | * | 3/1965 | Slayter ................... B22D 19/00 106/38.22 |
| 3,608,170 | A | * | 9/1971 | Larson et al. ......... B22D 19/085 164/100 |
| 4,842,037 | A | * | 6/1989 | Brown et al. ........... B22C 9/086 164/134 |
| 4,909,300 | A | * | 3/1990 | Horie ................. B01D 39/2093 164/69.1 |

* cited by examiner

*Primary Examiner* — Kevin P Kerns
(74) *Attorney, Agent, or Firm* — Leydig, Voit & Mayer, Ltd.

(57) ABSTRACT

An explosion-proof housing (10) with a pressure release device (11) and method of manufacture. The pressure release device (11) including a porous body (12) having a gas-permeable porous central area (13) and a surrounding edge zone (22). A peripheral surface (21) of the porous body (12) is arranged in the edge zone (22). The porosity and/or the pore size of the porous body is specified or changed at the peripheral surface (21), or at the edge zone (22), such that the penetration of liquid casting material (G) into the central area (13) of the porous body (12) is prevented across the peripheral surface (21) or the edge zone (22). The edge zone (22) thus forms a barrier (B) for the casting material (G) which enables the porous body (12) to be inserted in a casting mold (31) and insert molded with casting material (G) in production of an accommodating part (25) of the housing.

12 Claims, 3 Drawing Sheets

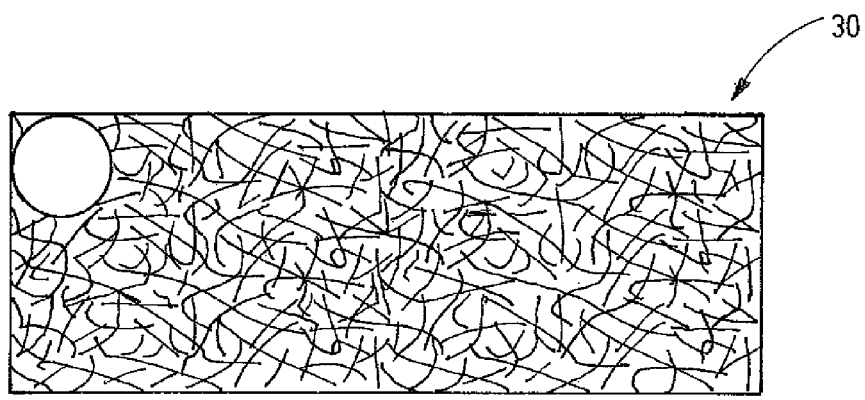
Fig.4
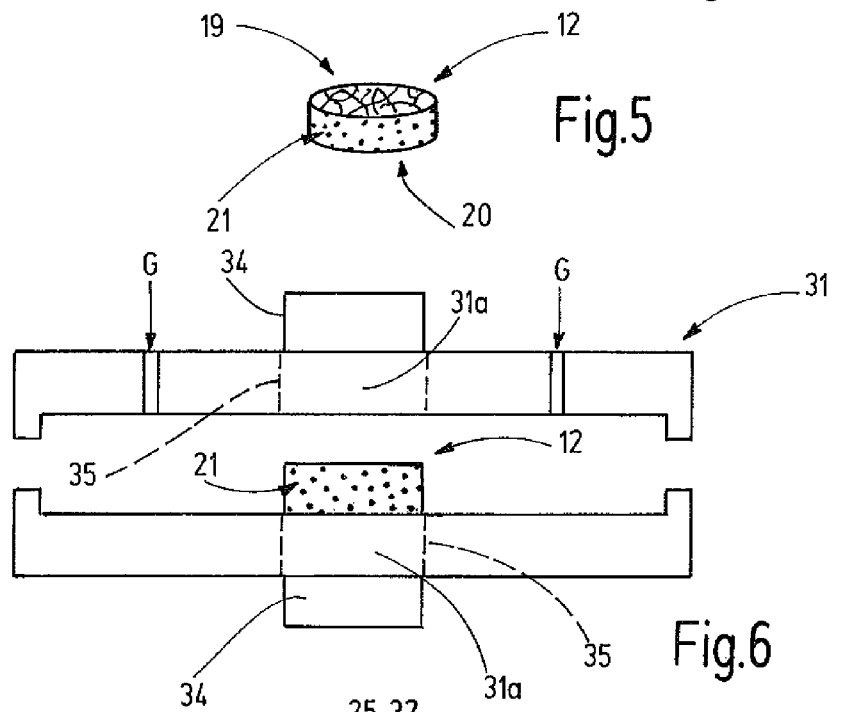
Fig.5
Fig.6
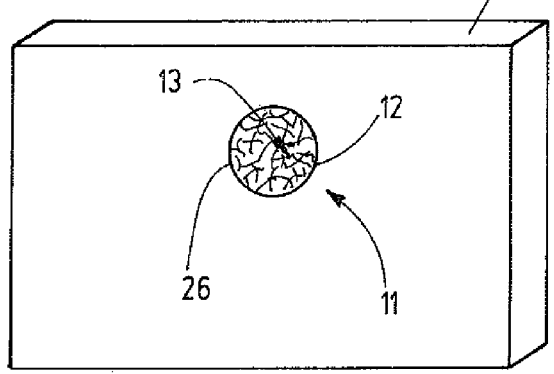
Fig.7a
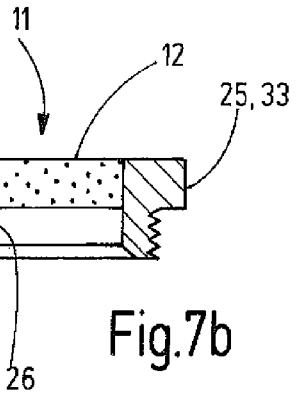
Fig.7b

PRESSURE RELEASE DEVICE FOR A HOUSING WITH FLAMEPROOF ENCAPSULATION AND METHOD FOR THE PRODUCTION THEREOF

FIELD OF THE INVENTION

The present invention relates to pressure release devices for explosion-protected housings and to a method of production.

BACKGROUND OF THE INVENTION

The explosion-protected housings typically form an ignition protection type "flameproof encapsulation" (Ex-d) within which electrical and/or electronic component parts or components are contained. Such electrical components can represent ignition sources for an explosive atmosphere present in the surrounding area outside of the housing. In such explosion-protected housings the pressure release device serves the purpose of establishing a pressure compensation between the housing interior and the surrounding area. It serves the purpose of limiting or reducing the pressure on the housing in the event of an explosion, which takes place within the housing, or also of compensating pressure differences to the surrounding area, for example by means of temperature changes. For this purpose, a gas-permeable connection is established between the interior of the housing and the surrounding area via the pressure release device. Simultaneously, the pressure release device ensures that flames, sparks or the like cannot reach from the interior of the housing to the outside into the explosive surrounding area. The housing as well as the pressure release device must thus be able to withstand an explosion pressure.

A pressure release device is known from U.S. Pat. No. 4,180,177 A, for example. In this document, a porous body is inserted in a pressure release passage. The porous body is gas-permeable. It is held in the pressure release passage so as to be clamped between ring flanges in flow-through direction.

A pressure release device which is designed with a similar principle is known from DE 2010 016 782 A1. A porous body is seized therein at a ring-shaped edge zone and is clamped tightly. By means of the clamping, a pore seal can also be attained in this edge zone. A hollow-cylindrical accommodating part, in which a pressure release passage is formed, serves to enclose the porous body. This hollow-cylindrical accommodating part can be inserted in the housing wall of an explosion-proof housing and can in particular be screwed in.

OBJECTS AND SUMMARY OF THE INVENTION

It is an object of the present invention to provide an improved pressure relief device that can be produced in a simple and cost efficient manner.

In the method according to the invention, a gas-permeable porous body is provided initially. This body is preferably a fiber structure body. It can comprise fibers which are arranged irregularly and which are intertwined, preferably of metal, and in particular of stainless steel. Preferably, all of the fibers consist of the same material.

As a modification of this exemplary embodiment of the porous body, it can also be embodied of one or a plurality of different layers. As an alternative or in addition to a layer of a fiber structure, provision can also be made for meshes, fabrics, fillings or other suitable structures of fibers.

It is also possible to produce the porous body from a foam material, from particles which are connected to one another by means of sintering, or the like.

The porous body is preferably detached from a porous base material which, for example, forms a web or a mat. For example, the detaching of the porous body from the base material can take place by means of punching, water jet cutting, wire eroding, laser cutting or plasma cutting. The porous body comprises a central area which is gas-permeable. This central area is surrounded by an edge zone, which is closed in peripheral direction. As a function of the contour of the porous body, the closed shape of the edge zone can be circular, rectangular, polygonal, curved or otherwise shaped. This edge zone contains the peripheral surface which surrounds the porous body. The peripheral surface connects two side surfaces of the porous body, by means of which a gas flow can occur in or out of the porous body. A barrier against the penetration of liquid casting material through the peripheral surface into the central area is present in the edge zone. This barrier can be formed by the edge zone or can be formed in the edge zone.

In the case of a preferred exemplary embodiment of the porous body, the stability in the edge zone or at least in the area of the peripheral surface is larger than in the central area of the porous body. Preferably, this stability increase takes place during the detaching and by means of the detaching of the porous body from a base material. A cold work hardening can be attained, for example, due to the impact of energy. Due to the relatively high porosity and the material of the base material or of the porous body the porous material flows and work-hardens in the cutting area in response to the detaching, for example in response to water jet cutting. An increase of the stability and/or a local compaction and/or a reduction of the pore size or a clogging of the pores at the separating surface, and thus at the peripheral surface of the porous body, is attained through this procedure. In the case of other separating methods, this solidification can be attained by the impact of thermal energy on the separating surface and thus on the peripheral surface of the porous body. The fibers in the area of the peripheral surface can thereby melt at least partially and can thus connect in a firmly bonded manner, which leads to an increased stability.

In the alternative, it is also possible to attain this increased stability by means of a process step after detaching the porous body from the base material.

The porous body can be inserted in a casting mold. Liquid casting material is subsequently introduced in the casting mold. An accommodating part is produced thereby. The accommodating part can be formed by a pressure release nozzle comprising a pressure release passage. Preferably, the accommodating part is formed by a housing wall or by the section of a housing wall of the explosion-proof housing. The accommodating part is preferably produced from a plastic, a metal material, or from a composite material. A positive and/or firmly bonded connection to the edge zone, and in particular to the peripheral surface and, in the case of an exemplary embodiment, only to the peripheral surface of the porous body, is created during the production of the accommodating part. Due to the fact that a barrier is present in the edge zone, liquid casting material cannot penetrate into the porous body in an uncontrolled manner. The porous body is insert molded or recast by the casting materials.

This casting process can take place by means of die casting, injection molding or transfer molding, e.g. Due to the forces and pressures which appear within the casting mold, there is a risk that, on the one hand, the casting material penetrates into the porous body in an uncontrolled manner, clogs the pores and negatively impacts the gas permeability in the central area and that, on the other hand, these forces, which appear, lead to deformations of the porous body, which also negatively impact a necessary sealing of the porous body against the casting material. Due to the barrier, which is present in the edge zone, an impacting caused by uncontrolled penetration into the porous body is prevented. In the case of a preferred embodiment of the porous body, the stability is furthermore increased in the area of the peripheral surface or of the edge zone, respectively. The edge zone thus provides the porous body with an additional mechanical stability. The deformation of the porous body during the casting process by means of process-related high pressures or forces is prevented in this manner.

To maintain the pressure resistance of the housing, a predetermined volume flow must be able to penetrate the porous body in the central area in the event of an explosion. This is the only way of ensuring that the explosion pressure does not damage the explosion-proof housing and that flames or sparks can escape into the explosive surrounding area. This is ensured by means of the barrier in the edge zone.

Advantageously, it is ensured in response to the casting process of the accommodating part that casting material can only come into contact with the peripheral surface or the edge zone of the porous body so that the barrier effectively prevents the penetration of casting material into the central area. For example, the two side surfaces can be closed or covered, respectively, by the casting mold.

In the case of a preferred exemplary embodiment, the casting mold is tempered by a tempering means. Preferably, the tempering means acts exclusively on a section of the casting mold which directly adjoins the porous body. In this manner, the porous body can be tempered in a specific manner. The tempering means can cool and/or heat the porous body. The porous body can thus be tempered indirectly via the casting mold. The solidification process of the casting material can thus be influenced when in contact with the porous body. In particular, the penetration depth of the casting material into the porous body can be influenced with the help of the tempering means. If the porous body is cooled, for example, the solidification process of the casting material can be accelerated when in contact with the porous body and the penetration depth can thus be reduced. This aspect of the method can also be effected independent from the formation of the barrier at the porous body.

Preferably, the central area has a substantially constant porosity and/or pore size. More preferably, the porosity and/or the pore size in the edge zone is smaller than in the central area. A barrier against the penetration of casting material into the central area can thus be formed by means of the reduced porosity or pore size in the edge zone.

In the case of a preferred exemplary embodiment, the porosity and/or the pore size in the edge zone is reduced during, and in particular, by means of the detaching of the porous body from a porous base material. In general, the barrier is created during and in particular by the detaching of the porous body from the base material. In response to this detaching, pressure and/or heat can be generated by the impact of a separating means of separating tool and a local melting or a local flowing of the porous base material can be caused through this at the cutting or separating surface. This has the result that the peripheral surface of the porous body, which runs along the cutting or separating surface, has a reduced porosity or a reduced pore size and the barrier is formed through this in the edge zone. In the case of this exemplary embodiment, a subsequent process step for treating the porous body can be forgone. The barrier is already created during and in particular by the detaching of the porous body from the base material.

Preferably, the barrier is produced by the impact of pressure and/or heat and/or radiant energy on the edge zone, wherein in particular, the porosity and/or the pore size in the edge zone is reduced. The material of the porous body, for example, can thereby melt locally in the edge zone and can reduce and/or close at least a part of the pores.

In the case of an exemplary embodiment, the barrier or the edge zone can also be formed by means of a separate ring part, which surrounds the gas-permeable porous central area. Such a ring part can be connected to the porous central area in a firmly bonded manner. The ring part can be made of plastic, metal or a composite material. The ring part does not need to be embodied in a completely gas-tight manner. It is sufficient that an edge zone comprising a barrier against the penetration of casting material and/or an increased mechanical stability is formed by means of the ring part. For this purpose, the porosity and/or the pore size needs to be sufficiently small. The ring part can thus also be formed by means of a grid structure or the like, which fulfills this purpose.

The porosity of the porous body in the central area is at least 60% and maximally 80%. The porosity of the porous body can be calculated as follows, for example:

$$\Phi = \left(1 - \frac{\rho}{\rho_0}\right) \cdot 100\%,$$

with
$\Phi$: porosity in percent
$\rho$: molded density of the body
$\rho_0$: true density of the body In the case of an exemplary embodiment, the pore size of the porous body in the central area is at least 80 micrometers and maximally 250 micrometers in at least one, and in particular, in a plurality of, or in all spatial directions.

In one embodiment, the porosity and/or the pore size in the edge zone is maximally 80% or maximally 50% or maximally 30% of the porosity and/or of the pore size in the central area.

If the porosity and/or the pore size in the central area is sufficiently small, the porous body can comprise a uniform porosity and/or pore size in the central area as well as in the edge zone. In the case of an exemplary embodiment, it is also possible that the pores of the porous body are closed completely in the edge zone. Completely closed pores is to be understood herein to mean such that no casting material can pass through the peripheral surface or through the edge zone in response to insert molding or recasting of the porous body during the production of the accommodating part during the casting.

In the case of a preferred exemplary embodiment, the edge zone has a maximum depth in a range of between 0.5 and 10 mm. The depth of the edge zone is determined in a direction parallel to the normal vector at the respective considered location of the peripheral surface. In the case of a circular peripheral surface, the depth is thus measured in radial direction, for example.

Preferably, the porous body consists of fibers, which are intertwined and arranged in an unordered manner. The fibers can have a round, irregular cross section or different cross section. They preferably have a diameter, which lies in the range of at least 70 micrometers and maximally 130 micrometers. In the case of the preferred embodiments described herein, all of the fibers of the porous body have a diameter within the specified range. The thickness of the porous body in flow-through direction is preferably at least 5 to 10 mm.

In the case of a preferred exemplary embodiment, the porous body consists of a material, which permanently withstands temperatures of at least 400° C. Preferably, the porous body is made of metal, and in particular, of chromium alloyed steel.

In one embodiment, the porous body is formed from intertwined unordered fibers, which has a coating at least in the edge zone. Due to this coating, a barrier against the penetration of the casting material can be formed in the edge zone in combination with a predetermined pore size and/or a predetermined porosity.

Other objects and advantages of the invention will become apparent upon reading the following detailed description and upon reference to the drawings, in which:

BRIEF DESCRIPTION OF THE DRAWINGS

FIGS. 4-6, 7a and 7b show an illustrative process for producing a pressure release device comprising a porous body in accordance with the invention;

Figure 1:
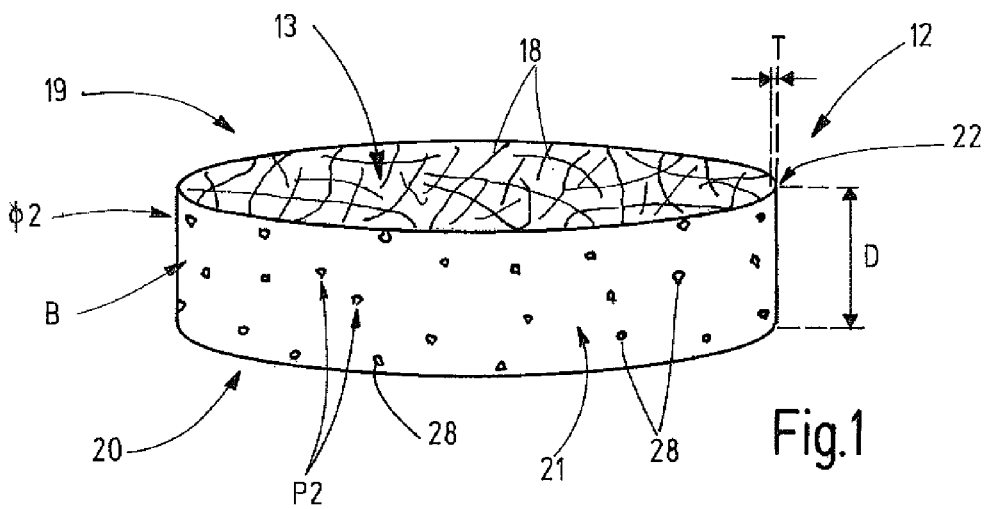
FIGS. 1-3 are schematic perspectives of exemplary embodiments of a porous body in accordance with the invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF PREFERRED EMBODIMENTS

Figure 8:
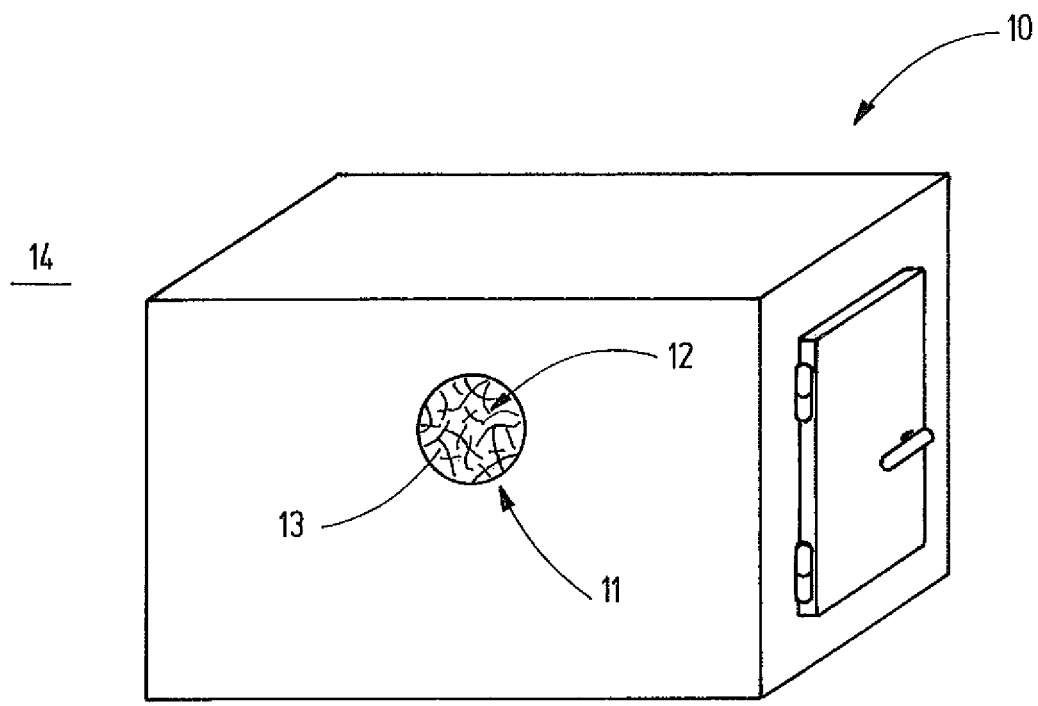
FIG. 8 is a perspective of an explosion-protected housing having a pressure release device in accordance with the invention.

Referring now more particularly to FIG. 8 of the drawings, there is shown an illustrative explosion-protected housing 10 having a pressure release device 11 in accordance with the invention. According to the example, the pressure release device 11 comprises a porous body 12. The porous body 12 has a gas-permeable porous central area 13, which provides for a gas exchange between the interior of the explosion-proof housing 10 and the surrounding area 14. It will be understood that electrical and/or electronic component parts or components are arranged in the interior of the housing 10. Due to the development of heat or sparks, these components can represent an ignition source for an explosive atmosphere in the surrounding area 14.

According to the example, the explosion-proof housing 10 provides an ignition protection type "pressure-resistant encapsulation" (Ex-d). The housing 10 is constructed such that it does not discharge any flames or sparks into the surrounding area 14 even in the event of an explosion within the housing 10. The housing 10 withstands the explosion pressure. To attain this, the pressure release device 11 is provided. A gas exchange is thus possible between the interior of the housing and the surrounding area 14, so that the explosion pressure in the housing 10 is limited. However, the pressure release device 11 must thereby be constructed such that no flames or sparks can reach into the surrounding area 14 and that a sufficient gas volume flow is attained by means of the pressure release device 11.

Figure 2:
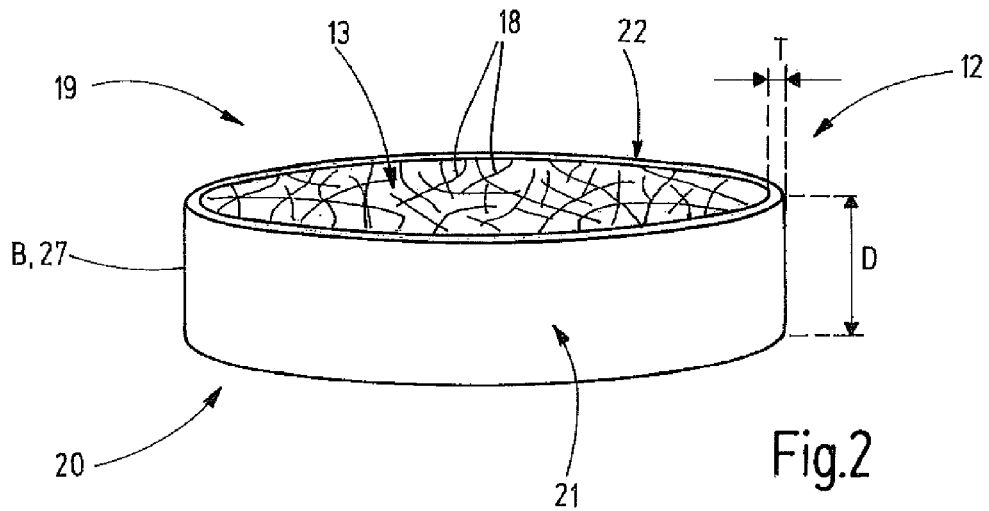
Figure 3:
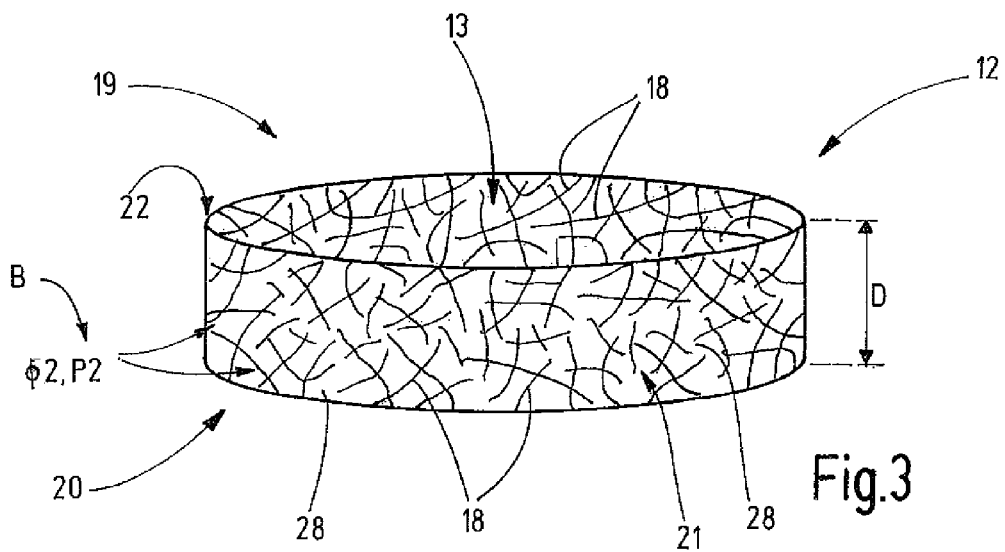

In the embodiments described herein, the pressure release device 11 comprises a porous body 12. Different embodiments of the porous body 12 are illustrated in FIGS. 1 to 3. According to the example, the porous body 12 is embodied as fiber structure part. It comprises or consists of a randomly oriented fiber mesh (FIGS. 1 to 3), the fibers 18 of which are unordered and intertwined. The fibers 18 are preferably metal fibers. According to the example, the fibers 18 withstand an ambient temperature of 400C.° or more. The fibers 18 can consist of alloyed steel, in particular chromium alloyed steel or stainless steel. The length of the fibers 18 can vary. For example, the fibers are at least several millimeters up to several centimeters long. The diameter of the fibers is at least 70 micrometers and maximally 130 micrometers. According to the example, all of the fibers 18 consist of the same material and have the same diameter.

The porous body 12 preferably has the shape of a disk and, according to the example, it is defined by two opposite side surfaces 19, 20. Gas can flow into or flow out of the porous body 12 through the side surfaces 19, 20. The thickness D of the porous body 12 between the two side surfaces 19, 20 is at least 5 to 10 mm.

The two side surfaces 19, 20 of the porous body 12 are connected to one another via a circumferential peripheral surface 21. In the case of the exemplary embodiments, which are illustrated herein, the peripheral surface 21 has a circular shape. The peripheral surface 21 can also comprise any other shape, for example a rectangular or polygonal shape, wherein the sections between corners can run straight or curved.

The porous body 12 has a central area 13 and an edge zone 22 which surrounds the central area 13. The edge zone 22 contains the peripheral surface 21 and, starting at the peripheral surface 21, extends with a depth T into the porous body 12. The depth T is thereby measured at right angles to a respective location on the peripheral direction 21. In the case of the porous body 12, which, according to the example, has the shape of a circular disk, the depth T of the edge zone 22 is thus determined in radial direction at right angles to the peripheral surface 21. The depth T is preferably maximally 0.5 to 10 mm. As in the case of the exemplary embodiment according to FIG. 3—the edge zone 22 can virtually be without any extension in depth direction and can quasi be limited to the plane of the peripheral surface 21. In other words, the depth T of the edge zone 22 can be arbitrarily small.

The edge zone 22 extends along the peripheral surface 21 completely around the central area 13 and is thus closed completely with respect to the orientation of the peripheral surface 21.

The edge zone 22 contains or forms a barrier B against the penetration of a free-flowing or liquid casting material G from which an accommodating part 25 is produced for accommodating the porous body 12 in a casting process, for example injection molding, transfer molding or die casting. The accommodating part 25 of the pressure release device 11 has a pressure release passage 26, through which gas can flow from the interior of the housing 10 into the surrounding area 14. The cross section of the pressure release passage 26 is adapted to the contour of the porous body 12 and in the case of the exemplary embodiment, it is thus cylindrical at least in sections. The porous body 12 is inserted in the pressure release passage 26 such that the escape of sparks or flames from the interior of the housing through the pressure release passage 26 into the surrounding area 14 is prevented.

In an exemplary embodiment, the barrier B against the penetration of the casting material G can be formed by means of a ring part 27 which is arranged in the edge zone 22 of the porous body 12 or which forms the edge zone 22 (FIG. 2). The ring part 27 can be produced from stainless steel and preferably forms a completely closed peripheral surface 21. Due to the ring part 27, it is ensured that the peripheral surface 21 is sealed against the penetration of a casting material G. A barrier B, which effectively prevents the penetration of casting material G through the peripheral surface 21 into the central area 13, is thus provided.

In other exemplary embodiments according to FIGS. 1 and 3, such a ring part 27 can be foregone. In the edge zone 22, the porosity Φ and/or the pore size P is specified or is changed by a treatment of the porous body 12 such that a penetration of casting material G through the peripheral surface 21 into the central area 13 is prevented. The penetration of casting material G through the peripheral surface 21 into the edge zone 22 can be possible. However, the barrier B prevents that casting material G from penetrating into the porous body 12 and into the central area 13 in an uncontrolled manner and increase the flow-through resistance at that location. By means of the size of the central area 13, a desired volume flow through the porous body 12 and thus through the pressure release device 11 can thus be ensured in the event of an explosion in the interior of the housing 10.

Figure 9:
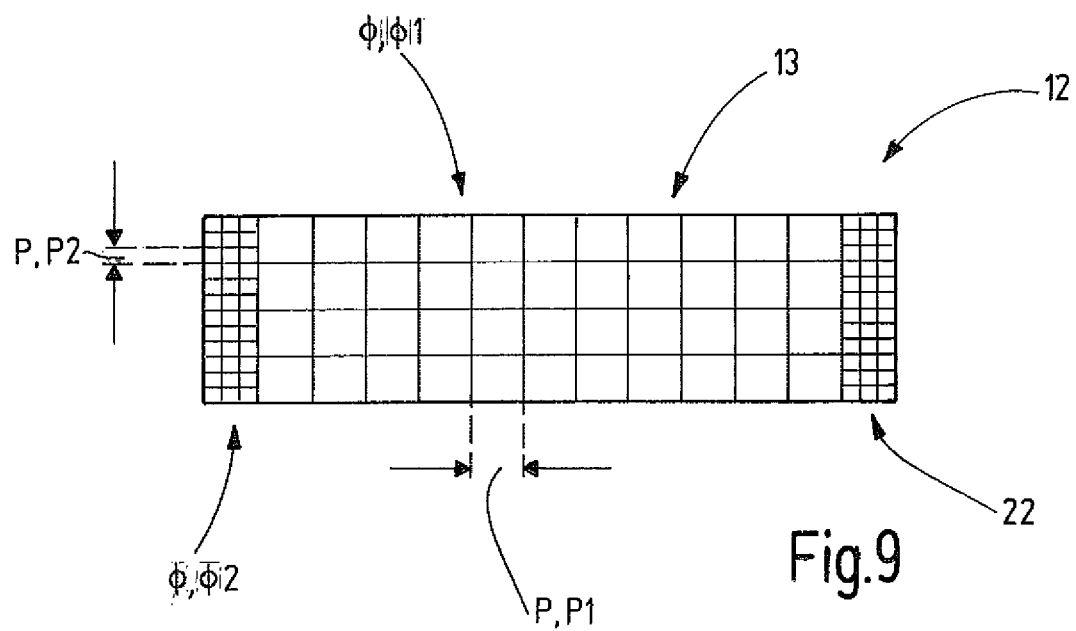
FIG. 9 is an enlarged schematic depicting the porosity and pore size of the porous body in a central area and an edge zone.

The pore size P and porosity Φ of the porous body are illustrated in FIG. 9. The central area 13 has a porosity Φ1 and a pore size P1. In the edge zone 22, the pore size P2 is smaller than the pore size P1 in the central area. In the alternative or in addition, the porosity Φ2 in the edge zone 22 is smaller than the porosity Φ1 in the central area 13. It is attained through this that a sufficiently large volume flow of the gas can pass through the porous body 12 in the central area 13 in the event of an explosion. At the same time, casting material G is prevented from penetrating through the peripheral surface 21 and the edge zone 22 into the central area 13 when producing the accommodating part 25 by means of recasting or insert molding of the porous body 12.

According to the example, the pore size of the porous body in the central area is at least 80 micrometers and maximally 250 micrometers, in at least one and, or preferably a plurality of or in all spatial directions. According to the example, the porosity Φ1 in the central area 13 is at least 60% and maximally 80%. The porosity is thereby determined as follows:

$$\Phi = \left(1 - \frac{\rho}{\rho_0}\right) \cdot 100\%,$$

with
Φ: porosity in percent
ρ: molded density of the body
$\rho_0$: true density of the body The porosity Φ2 and/or the pore size P2 in the edge zone 22 is 50% to 70% smaller, for example, than the porosity Φ1 and/or the pore size P1 in the central area 13 (FIG. 1). In the case of a different exemplary embodiment (FIG. 3), the porosity Φ and/or the pore size P within the entire porous body 12 can be constant, provided that the porosity Φ and/or the pore size P are sufficiently small so as to prevent the penetration of casting material G through the peripheral surface 21 and the edge zone 22 into the central area 13.

In the case of a preferred method for producing the pressure release device 11, the porosity Φ and/or the pore size P in the edge zone 22 is reduced by the impact of pressure and/or heat and/or radiant energy. The pores 28 in the edge zone 22 or at the peripheral surface 21 can thereby also be closed completely.

A preferred method for producing the pressure release device 11 is explained below with reference to FIGS. 4 to 7a and 7b:

According to the example, a porous base material 30, the thickness of which corresponds to the thickness D of the porous body 12, is provided initially. As is illustrated in FIG. 4, the base material 30 can be provided in the form of a web or mat.

The porous body 12 is detached from the base material 30 and is cut out according to the example. Cutting out the porous body 12 can take place by means of wire eroding, water jet cutting, plasma cutting, laser cutting or the like. When cutting out the porous body 12 from the base material part 30, particularly by laser cutting, sufficient energy, preferably heat, is introduced into the cutting area, which forms the peripheral surface 21 of the porous body 12. The material and, according to the example, the fibers 18, thereby melt locally in the area of the peripheral surface 21, whereby the porosity Φ2 and/or the pore size P2 is reduced at the peripheral surface 21. The pores 28 can also be closed completely. The reduction of the porosity Φ2 and of the pore size P2 in the area of the peripheral surface 21 is illustrated schematically in FIGS. 1 and 5. The reduced porosity Φ2 and pore size P2 at the peripheral surface 21 forms the barrier B against the penetration of casting material G.

The barrier B is thus created at the peripheral surface 21 by detaching the porous body 12 from the base material part 30 without an additional subsequent method step.

The detached porous body 12 (FIG. 5) is subsequently placed into a casting mold 31 (FIG. 6). The casting mold 31 is closed subsequently. The side surfaces 19, 20 and at least the central area 13 are thereby covered so that liquid casting material G does not come into contact with the central area 13 or with the side surfaces 19, 20, respectively. After closing the casting mold 31, casting material G is injected or pressed through the inlet channels into the interior of the casting mold 31. A high pressure or a high force is thereby exerted on the porous body 12. However, the penetration of casting material G through the edge zone 22 into the central area 13 is prevented by means of the barrier B. The porous body 12 is simultaneously connected to the accommodating part 25 in a positive and/or firmly bonded manner by producing the accommodating part 25 in the casting mold 31.

In the case of an optional preferred embodiment, a tempering means 34 can be present at the casting mold 31. The casting mold 31 and, according to the example, a section 31a of the casting mold 31, can be tempered via the tempering means 34. For example, the section 31a can be heated and/or cooled via the tempering means 34 as compared to the remaining casting mold 31. If required, the section 31a can be insulated in a suitable manner in relation to the adjoining sections of the casting mold 31, by means of an insulating means 35, which is illustrated in FIG. 6 schematically.

With the help of the tempering means 34, the temperature of the porous body 12 can be influenced in the casting mold 31 via the section 31a. It is possible through this to influence or to control the penetration depth of the casting material G. For example, the porous body 12 can be cooled via the tempering means 34 so that the casting material G solidifies more quickly and penetrates less deeply into the edge zone 22 when coming into contact with the porous body 12.

It is also possible to adjust a predetermined temperature profile via the tempering means 34 prior to and/or during and/or after filling the casting material G into the casting mold 31 so as to ensure the connection of the casting material G to the porous body 12 and, on the other hand, to control or influence the penetration depth thereby. As is illustrated schematically in FIG. 6, the tempering means 34 preferably acts exclusively on the section 31a of the casting mold 31. As an alternative to this, other sections of the casting mold 31 could also be tempered, thus cooled and/or heated, preferably independent from the section 31a.

In the alternative, the porous body 12 can also be tempered directly prior to being inserted in the casting mold 31. The penetration depth of the casting material G is determined by means of the temperature of the porous body 12, which can be defined in that manner, during the casting process.

According to FIG. 7a, a housing wall 32 or a housing wall section of the housing 10 can serve as accommodating part 25. As an alternative, a pressure release nozzle 33, as depicted in FIG. 7b, can serve as the accommodating part 25. In both cases, the accommodating part 25 has a pressure release passage 26, which is adapted to the peripheral contour of the porous body 12 at least in sections and in which the porous body 12 is located and via which the peripheral surface 21 or the edge zone 22, respectively, is connected to the accommodating part 25 in a positive and/or firmly bonded manner.

By insert molding or recasting the porous body 12 with the casting material G in the production of the accommodating part 25, a simple production of the pressure release device 11 is attained. A sufficiently fixed positive or firmly bonded connection between the accommodating part 25 and the porous body 12 can be attained along the peripheral surface 21 or the edge zone 22 without the formation of spark gaps. Due to the barrier B, which is present in the edge zone 22 or which is formed by the edge zone 22, it also prevents the casting material G from permeating into the porous body 12 in an uncontrolled manner that negatively impacts the gas permeability of the porous body.

As previously indicated, a further reduction of the porosity or of the pore size in the edge zone 22 of the porous body can be foregone in particular cases if the porosity or the pores 28 in the edge zone 22 are already sufficiently small with regard to the recasting medium and the selected processing parameters so that a permeation of the edge zone 22 and a penetration into the edge zone 13 of the casting material G is prevented during casting of the accommodating part 25. A barrier B is still formed in this way. As an alternative, it is also possible to coat the fibers 18 or the porous body 12 at least in the edge zone 22 and/or at least at the peripheral surface 21 and to form a barrier B by means of such coating.

From the foregoing, it can be seen that a pressure release device 11 is provided for an explosion-proof housing 10, as well as to a method for the production thereof. The pressure release device 11 includes a porous body 12 comprising a gas-permeable porous central area 13 and an edge zone 22 which surrounds this central area 13 in a ring-shaped manner. A peripheral surface 21 of the porous body 12 is disposed about the edge zone 22. The porosity and/or the pore size is specified or changed at the peripheral surface 21 or at the edge zone 22 such that the penetration of liquid casting material G into the central area 13 of the porous body 12 is prevented across the peripheral surface 21 or the edge zone 22. The edge zone 22 thus forms a barrier B for the casting material G. Because of this barrier B, the porous body 12 can be inserted in a casting mold 31 and can be recast or insert molded with casting material G in the production of an accommodating part 25. A positive or firmly bonded connection between the accommodating part 25 and the porous body 12 is thus created simultaneously with the production of the accommodating part 25. The pressure release device 11 can thus be integrated directly into a housing wall 32 or a pressure release nozzle 33 can be provided with the porous body 12.

LIST OF REFERENCE NUMERALS 10 explosion-proof housing
11 pressure release device
12 porous body
13 central area
14 surrounding area
18 Fiber
19 side surface
20 side surface
21 peripheral surface
22 edge zone
25 accommodating part
26 pressure release passage
27 ring part
28 Pore
30 base material part
31 casting mold
31a section of the casting mold
32 housing wall
33 pressure release nozzle
34 tempering means
35 insulating means
Φ porosity
Φ1 porosity in the central area
Φ2 porosity in the edge zone
B barrier
G casting material
P pore size
P1 pore size in the central area
P2 pore size in the edge zone

The invention claimed is:

1. A method for producing a pressure release device (11) for an explosion-protected housing (10),
   providing a gas-permeable porous body (12) by detaching the porous body from a porous base material part (30) having a porosity sufficient to passage of pressurized gas resulting from an explosion within the explosion proof housing (10) while preventing the passage of flames and sparks,
   creating an edge zone (22) about the porous body (12) which has a peripheral surface (21) surrounding a central area (13) of the porous body during and by the detaching of the porous body from the base material,
   increasing the stability of the edge zone as compared to the stability of the central area by the impact of at least one of force pressure, heat and radiant energy on the edge zone during and by the detaching of the porous body from the base material part such that the edge zone (22) forms a barrier (B) for preventing penetration of liquid casting material (G) through the peripheral surface (21) into the central area (13),
   thereafter inserting the porous body (12) in a casting mold (31), and
   introducing liquid casting material (G) into the casting mold for producing an accommodating part (25) for the pressure release device (11) and for forming a connection between the peripheral surface (21) of the porous body (12) and the accommodating part (25) such that the porous body (12) is arranged in a pressure release passage (26) of the accommodating part (25).

2. The method of claim 1 including increasing the stability of the edge zone of the porous body by causing the pores of the edge zone to have a smaller porosity ($\Phi$) and/or a smaller pore size (P) than the central area (13).

3. The method of claim 2 including reducing the porosity ($\Phi 2$) and/or the pore size (P2) in the edge zone (22) of the porous body by local melting and/or local flowing of the material of the porous body (12).

4. The method of claim 1 including providing a ring part (27) about the edge zone (22) of the porous body (12) which surrounds the central area (13) of a material which differs from the central area (13).

5. The method of claim 1 including tempering at least one section (31a) of the casting mold (31) by means of a tempering means (34) before and/or after the casting material (G) is introduced.

6. The method of claim 5 including tempering a section of the casting mold (31) which adjoins the porous body (12) by the tempering means (34).

7. The method of claim 1 including increasing the stability of the edge zone by completely closing the pores of the porous body (12) in the edge zone (22).

8. The method of claim 1 including providing the porous body (12) with an edge zone (22) having a maximum depth (T) of 0.5 to 10 millimeters at right angles to the peripheral surface (21).

9. The method of claim 1 including providing the porous body (12) with a porosity ($\Phi 1$) in the central area (13) of at least 60% and maximally 80%.

10. The method of claim 1 including providing the porous body (12) having pore size (P1) in the central area (13) that is at least 80 micrometers and maximally 250 micrometers.

11. The method of claim 1 including providing porous body (12) formed from fibers (18) which have a diameter of at least 70 micrometers and maximally 130 micrometers.

12. The method of claim 1 including providing a porous body (12) that is produced from stainless steel.

\* \* \* \* \*